United States Patent
Hylen et al.

(10) Patent No.: US 7,391,966 B2
(45) Date of Patent: *Jun. 24, 2008

(54) SELECTIVE FOCUS SYSTEM FOR USE IN PHOTOGRAPHY

(75) Inventors: Steven Hylen, Roxbury, CT (US); Mitch Ruda, Tucson, AZ (US)

(73) Assignee: SmARTlens Corporation, Big Canoe, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/382,823

(22) Filed: May 11, 2006

(65) Prior Publication Data

US 2007/0014560 A1     Jan. 18, 2007

Related U.S. Application Data

(63) Continuation of application No. PCT/US02/39367, filed on Dec. 9, 2002.

(60) Provisional application No. 60/338,933, filed on Dec. 7, 2001.

(51) Int. Cl.
- G03B 3/00 (2006.01)
- G03B 13/18 (2006.01)
- G03B 13/32 (2006.01)
- G03B 11/00 (2006.01)

(52) U.S. Cl. .......................... 396/89; 396/544
(58) Field of Classification Search ................. 396/124, 396/316, 340, 544, 439, 72, 111, 114, 89
See application file for complete search history.

(56) References Cited

U.S. PATENT DOCUMENTS

| | | | |
|---|---|---|---|
| 1,501,161 A | 7/1924 | Cooke | |
| 3,305,294 A | 2/1967 | Alvarez | |
| 3,583,790 A | 6/1971 | Baker | |
| 4,783,141 A | * 11/1988 | Baba et al. | 359/619 |
| 4,783,153 A | * 11/1988 | Kushibiki et al. | 359/665 |
| 4,805,998 A | 2/1989 | Chen | |

(Continued)

FOREIGN PATENT DOCUMENTS

JP       58-100836 A       6/1983

(Continued)

*Primary Examiner*—Christopher Mahoney
(74) *Attorney, Agent, or Firm*—Darby & Darby

(57) ABSTRACT

An optical system is provided for allowing regional focus control. The system uses a variable power optical component system as two optical shear plates that can be laterally displaced with respect to each other to adjust and alter the field curvature of the optical system. This changing of the field curvature creates an area of focus whose particular size and shape within the field of view is controlled through manipulation of the shear plates with respect to each other and the field of view. The area of focus can be repositioned to any point within the field of view so that the area of focus can affect the image light coinciding with that particular region. The shear plates are preferably positioned at the intermediate focal plane of the optical system, between the camera body and the taking lens. The image which has been altered, by the shear plates is then transposed to the camera body by a relay lens and recorded by film at the primary film plane located within the camera body. The end result is a optical system that is suitable for a camera wherein regional focus control is achieved, regardless of the depth of field of the camera taking lens or its aperture settings.

7 Claims, 7 Drawing Sheets

U.S. PATENT DOCUMENTS

| | | |
|---|---|---|
| 5,649,259 A | 7/1997 | Hylen |
| 6,167,206 A | 12/2000 | Hylen |
| 6,201,933 B1 | 3/2001 | Hylen |
| 6,285,834 B1 | 9/2001 | Hylen |
| 2004/0027684 A1 * | 2/2004 | Nishioka et al. ............ 359/676 |

FOREIGN PATENT DOCUMENTS

| | | |
|---|---|---|
| WO | WO-03/050609 | 6/2003 |

* cited by examiner

FIG. 1
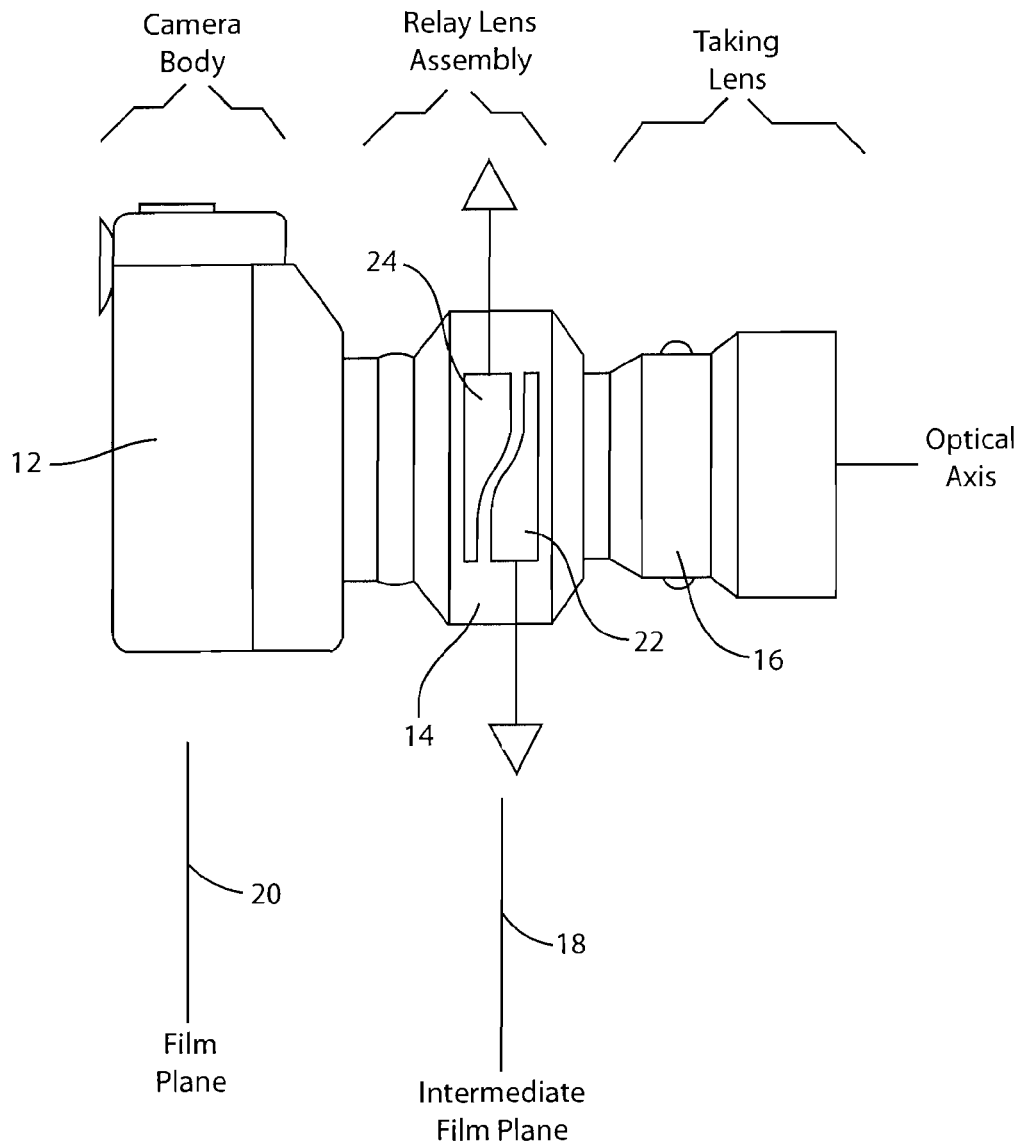
FIG. 2A
FIG. 2B
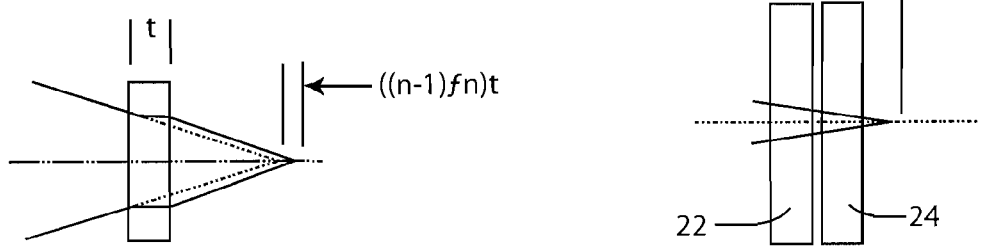

SELECTIVE FOCUS SYSTEM FOR USE IN PHOTOGRAPHY

CROSS REFERENCE TO PRIOR APPLICATION

This application is a continuation of PCT International Patent Application No. PCT/US2002/39367, filed Dec. 9, 2002, which claims priority of U.S. Patent Application No. 60/338,933, filed Dec. 7, 2001, both of which are incorporated by reference herein. PCT International Application No. PCT/US2002/39367 was published on Jun. 19, 2003 as Publication No. WO 03/050609.

BACKGROUND OF THE INVENTION a) Field of the Invention

This invention generally relates to cameras and camera accessories, and more particularly, to systems for controlling the regions of focus within a field of view of a camera.

b) Description of the Prior Art

During the past century, since the invention of the still-type film camera, photographic technology has introduced many different types of cameras, usually identified by the format of film used. Today, for the most part, three main types of still-type film cameras are commercially available, 35 mm cameras (including point and shoot type camera, disposable cameras, single lens reflex cameras, and rangefinder type cameras), medium format cameras (including twin-lens), and large format cameras (including field-type and view type). These cameras use one of at least six basic systems of focusing: (1) fixed-focus, (2) "zone-focus", (3) rangefinder-type focus, (4) twin-lens reflex ground glass, (5) single-lens reflex, and (6) automatic focus.

In a fixed-focus camera, such as a conventional disposable type camera, there is no means to control the focus of the lens. The focus of the lens is pre-set in the factory to provide acceptable focus at a predetermined distance (usually around 10 feet). This type of camera is essentially a pin-hole camera with a lens.

Camera operators using "zone-focus" cameras must estimate (or actually measure) the distance between the camera and the subject and use this information to control the focus of the lens so that the subject is reproduced in focus at the film plane of the camera.

A rangefinder focusing system uses an optical-mechanical device that produces two images in a viewfinder of the camera. The focusing device effectively functions as a distance measurer (or rangefinder) to help the operator determine the distance between the subject and the camera. In operation, as the operator adjusts the focus control of the lens, the two images within the viewfinder move with respect to each other. A subject is in focus when oth images overlap and appear as one image within the viewfinder.

A twin-reflex camera uses two identical lenses that include synchronized focus controls so that both lenses move simultaneously. One lens focuses an image onto a focusing screen for the operator while the other lens focuses essentially the same image onto the film plane. When the operator adjusts the first lens so that the image is in focus on the focusing screen, the second lens will be properly adjusted so that the image will also be in focus at the film plane.

The single-lens reflex focusing system (or SLR) is one of the most popular focusing systems used in today's cameras. This type of focusing system allows the operator to view the actual image that will be recorded by the film. A pivotal mirror rests in the path of incoming image light and is used to direct the image light from the lens to a focusing screen, which may be viewed by the operator through an eyepiece. The camera operator may manually (or with the assist of an automatic focusing system) adjust the lens focus until the desired image focus appears on the focusing screen. The focusing screen usually includes a focusing reticle to assist the operator in determining when the subject is in "true" image focus. When the shutter release button of the SLR camera is depressed, the pivotal mirror immediately pivots away from the path of incoming image light and allows the image light to continue to the film gate and film. The distance between the lens and the focusing screen is equal to the distance between the lens and the film plane so that a viewed focused image will be recorded in focus. This type of focusing system allows the camera operator to "sample" or test the focus adjustments of the particular lens before any film is exposed.

Finally, cameras that automatically focus include a battery-powered motor drive unit that directly controls the focus of the particular lens assembly, and at least one type of electronic distance sensor, such as sonar, infrared, or phase-contrast. The sonar and infrared sensors essentially determine the distance between the subject and the camera and then cause the motor to control the focus of the lens accordingly. The phase-contrast system measures the contrast of adjacent lines of the incoming image light and similarly, uses this information to control the focus of the lens.

Motion-film cameras or movie cameras typically use a zone-focusing system wherein the camera operator (or an assistant) will actively control the focus of a lens during a particular shoot. If the subject advances towards (or recedes away from) the camera, the camera operator may have to "rack focus" the lens during a shoot to maintain the moving subject within the depth of field of the lens in use and in focus on the film. Regardless of how the focus of a particular lens is adjusted, most of the motion-film cameras used today allow the cameraman to view the image through the lens (i.e., in an SLR manner).

Most of the above-described focusing systems are limited in that they are designed to focus an image evenly across the field of view as centered about a lens pupil (or a center axis). Furthermore, the focus of a lens is dependent on the depth of field of the particular lens. In turn, the depth of field is affected by the lens aperture, the focal length of the lens, and the distance between the camera and the subject. For example, a telephoto lens (having a large focal length, such as 400 mm) will yield a short or narrow depth of field (or depth of focus), resulting in only a slim portion of an object in the field of view being recording in sharp focus. In contrast, the depth of field of a wide angle lens (having a relatively short focal length, such as 14 mm or 28 mm) is close to infinite, resulting in all essentially objects in the field of view (foreground and background) being recorded in sharp focus. To this end, a director may create a mood or mystique within a particular shot by softening or de-focusing part of an image. For example, foreground actors and objects within a particular scene may be effectively "pushed" out from the depth of field (focus range) and thereby de-focused (which will effectively minimize their significance to the viewers), while a particular subject located further from the camera may be kept within the depth of field and will be recorded in focus on the film. Of course, in this situation, the audience will "focus" their attention on what is in focus in the image, the main subject.

Although this method of using the depth of field (created by either the aperture setting and/or the focal length of the lenses is quite effective at directing the audience to what is significant in the image, the method does have several limitations that severely constrain the director's creativity.

In the above example, the director would have to use a lens having mid to long focal lengths (e.g., telephoto) to obtain the desired selective de-focusing effect. Unfortunately, lenses with long focal lengths require a minimum focusing distance, typically between 10 and 20 feet. To achieve the desired selective de-focusing effect, the director would have to position the camera at least 10 feet from the subject. This minimum focusing distance requirement may not easily be met depending on the particular scene being shot. For example, the scene may be located within an elevator or on a submarine, or any other close-quartered environment wherein the minimum focusing distance requirement cannot be achieved without building a "specialized movie set", or using soft-focusing techniques.

A common effects technique used in both still and motion photography to selectively de-focus or soften selective regions of a particular scene includes the use of a translucent medium, such as tissue paper, petroleum jelly or a frosted glass plate. The technique includes applying the translucent medium directly to (or positioning it in front of) the camera lens. The translucent medium effectively diffuses a select portion or region of image light entering the camera so that the resulting recorded image is softened, and selected detail is diluted. Although this de-focusing technique is somewhat effective at creating soft, de-focused regions of an image frame, the technique requires substantial setup time prior to shooting, and substantial clean-up time after the shoot. Also, the technique is difficult to control accurately in selecting exact image regions to de-focus, and is further difficult to reproduce when a re-shoot is necessary, or in such instances wherein the actors actually move within the scene (which is, of course, often the case).

Also, using this well-known technique, in each situation of a shoot, all subjects located within the depth of focus will be recorded in focus on the film. The director cannot create an image wherein only one of two different subjects and/or objects within the same plane with respect to the camera is in focus. It would be desirable to record an image of a person, for example, wherein only their face and a smoking gun located in their hand (both located in the same image plane) are in focus.

Another technique available to photographers to de-focus or otherwise soften selected regions of an image frame includes what is called a "shift and tilt" mechanism, which pivotally connects a lens to a camera body. The shift and tilt mechanism allows a lens to both pivot and laterally shift with respect to a central optical camera axis, thus enabling a controlled distortion of selected regions of an image frame (to "shift" the lens means to slide it parallel to the viewfinder image, while keeping the lens' optical axis at right angles to the film plane). By tilting the lens up or down (or left or right), photographers can change the angle between the optical axis and the film plane. This allows the photographer to modify the plane of focus in the resulting photographs and in doing so, achieve a variety of effects. One such effect is the ability for the photographer to focus just a specific part of the subject.

A shift and tilt mechanism is used in most large format cameras and is available (as an attachment) for use with motion picture cameras. The mechanism is difficult to use and is subject to unwanted distortion, unless any of a limited number of dedicated lenses are used, which severely limits the director's creativity and control. Also, the regional focus-control offered by the shift and tilt mechanism is limited to single peripheral regions of the image frame, not multiple internally located regions, such as a central region within the image scene.

U.S. Pat. No. 6,167,206 of Hylen (Applicant) issued Dec. 26, 2000 and entitled "Image Modifiers for Use with Photography", discloses a focus control system for use in photography wherein a modifier located at an intermediate focal plane within the lens system receives image light from the lens, the light is then relayed to the film. According to the patent, which is hereby incorporated by reference in its entirety, as if it were reprinted within the present specification, the modifier may be selectively deformed in such a manner as to create different regions of focus within a particular image, as the image light is projected onto the modifier and thereafter, re-focused onto the film. Applicant has been issued three other relevant patents all commonly assigned and of Hylen. These patents are: U.S. Pat. Nos. 6,285,834 6,201,933 5,649,259. These patents are similarly incorporated by reference, in their entirety.

U.S. Pat. No. 3,305,294 of Alvarez, issued Feb. 21, 1967 discloses a lens system for aberration correction and control in an optical system. The patented system includes a pair of bicubic phase profile optics, each an inverse of the other. When in perfect registration, the pair of optics produce a null wavefront and do not effect image light passing therethrough. However, translation of one optic relative to the other along one axis results in cylindrical focus (or de-focus) along the particular axis of translation (cylindrical focus or de-focus produces such focus or de-focus occurs only in vertical or horizontal strips, not symmetrically about the optical axis). Translation along both axes produces variable spherical or astigmatic power which may be used for wavefront correction or for a controlled aberration source.

U.S. Pat. No. 3,583,790 of Baker, issued Jun. 8, 1971, entitled "Variable Power, Analytic, Function, Optical Component in the Form of a Pair of Laterally Adjustable Plates having Shaped Surfaces, and Optical Systems Including such Components" discloses an optical assembly that uses at least two refracting plates. The plates are arranged generally perpendicular to an optical axis and adjacent to each other in a fitted orientation. The plates have quintic or higher order surfaces that are relatively movable laterally in such a manner that provides a zoom function within a lens system. The plates help correct spherical aberration within the lens system.

The above-described U.S. Pat. Nos. 3,305,294 of Alvarez, and 3,583,790 of Baker are hereby incorporated by reference, in their entirety.

It is accordingly an object of the invention to provide a focusing system for use with a camera which overcomes the limitations of the prior art.

It is another object of the invention to provide a focusing system for use with a camera which allows select regions of an image frame to be purposely de-focused in a controlled and efficient manner.

It is another object of the invention to provide a special effects device for use in photography which overcomes the limitations of the prior art.

SUMMARY OF THE INVENTION

An optical system is provided for allowing regional focus control. The system uses a variable power optical component, such as a lens, a piece of wavy glass, or a more complex pair of optical shear plates that can be laterally displaced with respect to each other to adjust and alter the field curvature of the optical system. This changing of the field curvature creates an area of focus whose particular size and shape within the field of view is controlled through manipulation of the shear plates with respect to each other and the field of view. The area of focus can be repositioned to any point within the field of view so that the area of focus can affect the image light coinciding with that particular region. The shear plates are preferably positioned at the intermediate focal plane of the optical system, between the camera body and the taking lens. The image which has been altered, by the shear plates is then transposed to the camera body by a relay lens and recorded by film at the primary film plane located within the camera body. The end result is an optical system that is suitable for a camera wherein regional focus control is achieved, regardless of the depth of field of the camera taking lens or its aperture settings.

BRIEF DESCRIPTION OF THE DRAWINGS

FIG. 1 is a side view of an optical system in the form of a camera including a camera body, a relay lens, and a taking lens, the relay lens being in partial section revealing some detail of shear plates, according to the invention;

FIG. 2a-c are plan views of lens systems for the purpose of explaining how shear plates alter the focal point and field curvature of an optical system when they are shifted, according to the invention;

DETAILED DESCRIPTION OF THE PREFERRED EMBODIMENT

Figure 2C:
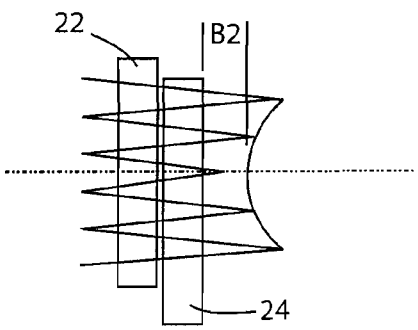

Referring to FIG. 1, a camera 10 is shown, including a camera body 12, a relay lens assembly 14, and a taking lens 16. Camera body 12, and taking lens 16 may be conventional, however, in the preferred embodiment relay lens assembly 14 is generally based on the relay lens described in U.S. Pat. No. 6,167,206 of Hylen, and commonly assigned. Relay lens assembly 14 is used to create an intermediate focal plane 18. As an image enters taking lens 16, the image is first focused onto the intermediate focal plane 18. Access is provided through a slot or panel (not shown) in the housing of relay lens assembly 14 for inserting a variety of image filters and modifiers at the exact point of focus (i.e., at the intermediate focal plane 18). The incoming light would then be "relayed" or refocused to the awaiting film located within the camera body 12 at the main or primary film plane 20.

As described in U.S. Pat. No. 6,167,206, altering the incoming image while it is in focus allows for greater modifying control of the image. Modification may include merely adding a colored filter effect to the image or altering the image light to convey the subject as a painting, or to introduce a mosaic effect, or as also described in U.S. Pat. No., control which regions of the image remain in focus, and which regions are forced to become de-focused, or "degraded".

As detailed in U.S. Pat. No. 6,167,206, a flexible screen is located in the immediate vicinity of the intermediate focal plane and positioned generally perpendicular to the optical axis. The flexible screen would be selectively deformable in a controlled manner along the line of sight (optical axis) so that select portions of the screen would extend beyond the "depth" of focus of the intermediate focal plane. These extended portions of the flexible screen would receive the image light outside the depth of focus and would thereby create regions of de-focused image light. The resulting degraded and modified image would be relayed to the film using appropriate relaying lenses so that the film of the camera would record the degraded and modified image, as dictated by the deformed flexible screen.

In the field of photography, control of light is everything, and the ability to control not only the focus of an overall image, but select regions within that image would be very desirable. To this end, the above-described system (which is disclosed in U.S. Pat. No. 6,167,206) would be very useful, however, creating such a flexible screen that can be repeatedly deformed over a long period of time with desired control of focus may prove to be difficult. In response to this effort to provide regional focus control, as described in this immediate provisional patent application, a pair of variable-power optical components (e.g., shear plates 22, 24) are positioned at the intermediate focal plane 18, in place of the flexible screen system described in U.S. Pat. No. 6,167,206.

One such variable-power optical component was developed by L. W. Alvarez and includes a pair of bicubic phase profile optical plates, one plate having an exact inverse shape of the other. The plates, which are described in U.S. Pat. No. 3,305,294 (previously incorporated by reference) are generally positioned perpendicular to an optical axis and may be independently displaced (laterally and in opposing directions) so that light along the optical axis is influenced, in varying degrees, in response to such plate movement, and in relation to the magnitude of lateral displacement of the plates.

The present optical system preferably uses a variable power optic at the intermediate focal plane 18 (see FIG. 1). The variable optic may be as simple as a piece of optical glass (or plastic) with a particular shape (such as a lens or a cylindrical element) or may be more complex, such as the variable power optical plates (what is referred to here as "shear" plates 22, 24), similar to those disclosed in the above-identified U.S. Pat. No. 3,305,294. Although, a great deal of this patent application refers to shear plates as the means to control regional focus, it should be understood that any of a variety of variable power optics can be employed at the intermediate focal plane 18 to create controlled distortion which may then be used to control focus regionally throughout the field of view.

The determination and manufacture of the particular shape of the shear plates is not necessary to an understanding of the invention. Each shear plate has a facing surface of predetermined shape that is defined by a preselected polynomial equation having a nonzero term of at least fifth order. As described below, as each plate is laterally displaced with respect to each other along a variety of lines of displacement, the optical characteristics of image light passing through the optical system (including taking lens 16, the shear plates 22, 24 and relay lens 14) is affected, and the resulting variation may be used to the advantage of the photographer in controlling regional focus throughout the image. Shear pates 22, 24 illustrated in this provisional patent application are used to illustrate the concept of the invention, and relative movements and positioning of the plates. The actual shape of shear plates 22, 24 is more complex and includes a surface similar to that shown in the shear plates of U.S. Pat. Nos. 3,583,790 and 3,305,294.

As illustrated in FIGS. 2a, 2b, and 2c, lateral displacement of shear plate 22 with respect to shear plate 24, the focal length of the variable optical system will be shifted, as defined by:

Shift in Focal Length=$((n-1)/n)(t)$

Where n is the index of refraction of the particular material of the shear plates and, where t is the thickness of the combined shear plates at a particular point (e.g., along the optical axis). As the shear plates (22, 24) are laterally shifted, the combined thickness will vary, and therefore, the focal length of the shear plates will shift and the field curvature of the optical system will be altered.

The invention uses this shift of focal length to create controlled regions of focus within the image.

There is a problem associated with using shear plates within the optical system of a camera. As the shear plates are laterally displaced (with respect to each other), not only is the focal point of the shear plates repositioned (as described above), but other optical characteristics of the overall optical system are also altered, such as the overall focus and overall magnification of the system (i.e., zoom). The invention compensates for these secondary affects by adjusting other optical components within the optical system in relation to lateral displacement of shear plates 22, 24, which is understood by those of skill in the art.

As introduced above, FIG. 1 shows a pair of shear plates 22, 24 positioned at the intermediate focal plane 18. Shear plates 22, 24 are preferably mounted within the housing of the relay lens 16 in such a manner that allows for either manual (through actions by the camera operator) or automatic (through powered drive actuators) lateral displacement of both shear plate 22, 24. Shear plates 22, 24 are preferably laterally displaced in a controlled and accurate manner so that the movement of each shear plate is synchronized, opposing, and generally within (or immediately adjacent to) the intermediate focal plane 18).

Figure 3:
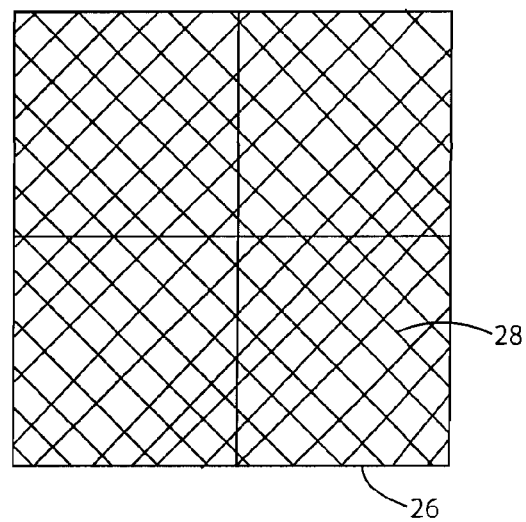
FIG. 3 is a representative plan view of a field of view of an optical system wherein hatching represents an area of focus, showing a full area of focus, according to the invention.

Referring to FIG. 3, a square is shown which represents a field of view 26 of a camera along an optical axis (which is perpendicular to the field of view and not otherwise shown). The hatching shown in FIG. 3 represents the areas of focus 28 with respect to the optical system, in this case, the entire field of view is in focus and the image focus will depend on the focus of the overall system and the relative placement of the subject within the field of view. In other words, the field of view shown in FIG. 3 is illustrative of a conventional camera optical system.

Figure 5:
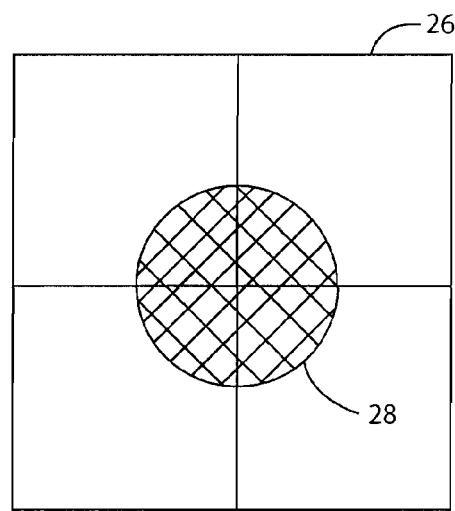
FIG. 5 is a representative plan view of a field of view of an optical system of FIG. 4, showing a smaller central circular area of focus, according to the invention.
Figure 6:
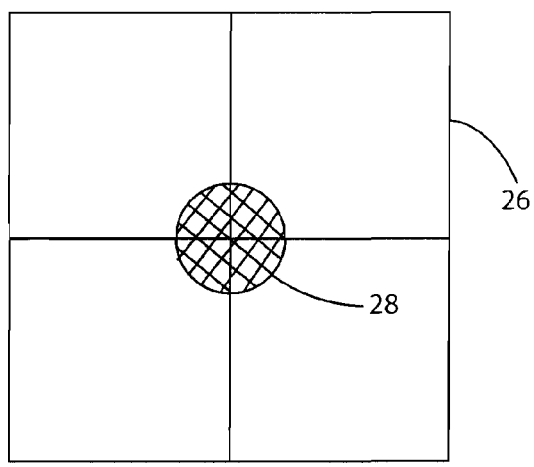
FIG. 6 is a representative plan view of a field of view of an optical system of FIG. 5, showing a still smaller central circular area of focus, according to the invention.
Figure 7:
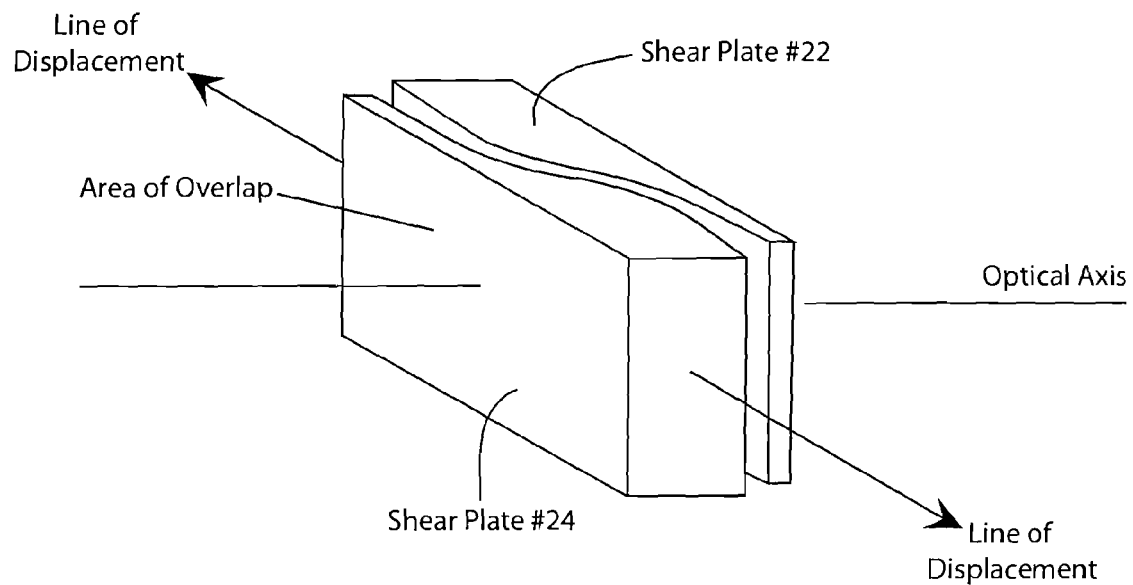
FIG. 7 is a perspective representative view of shear plates, detailing a horizontal line of displacement, the optical axis and the area of overlap, according to the invention.

Referring now to FIGS. 4, 5, 6, and 7, as shear plate 22 is initially laterally displaced with respect to shear plate 24 (along a horizontal line of displacement), as shown in FIG. 7, the area of focus 28 of the field of view 26 changes by becoming somewhat circular, symmetrical about the optical axis (i.e., centered within the field of view). With the shear plates 22, 24 slightly laterally displaced, the image light passing through the optical system will include focused regions that are located within the area of focus 28 and regions that appear de-focused (or soft) that are located within the field of view 26, but outside the area of focus 28.

Figure 4:
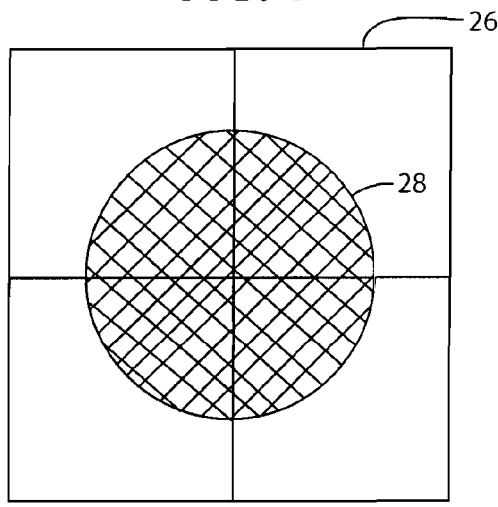
FIG. 4 is a representative plan view of a field of view of an optical system of FIG. 3, showing a central circular area of focus, according to the invention.

By increasing the magnitude of lateral displacement of shear plate 22 with respect to shear plate 24, as shown in FIG. 7, the size of the area of focus 28 becomes smaller in size, but maintains its generally circular shape, as illustrated in FIGS. 4, 5, and 6. Controlling the size of the area of focus 28, regardless of its shape is critical to achieving regional focus control of the camera optical system. Furthermore, once an area of focus 28 has been established (i.e., size and shape), it would be desirable to be able to relocate the area of focus anywhere throughout the field of view, since in photography, the subject (or objects) that are intended to be in focus are not necessarily located at the center of the field of view. For example, a director of photography captures an image of a crowd of people including a lead actress wearing a trench coat, but otherwise blending in with the crowd. With the focus control of the present optical system, the director can first manipulate the shear plates 22, 24 so that they are laterally displaced to create an area of focus 28 that is circular, for example (similar to the shape and size of the woman's face). Once the shape and size of the area of focus 28 is established, the displaced pair of shear plates 22, 24 can together (without changing their relative displacement) be moved within the field of view so that the area of focus can be repositioned to any region of the image that the director desires to be in focus, for example, over the face of the subject of significance within the crowd. The resulting image reveals a crowd of people, many of which are within the depth of field of the conventional camera optical system, but only predetermined and specific regions within the depth of field are in focus, in this example, only the woman's face is in focus, perhaps to direct the audience to the subject and to thereby carefully orchestrate the emotion of the scene.

Prior to describing a preferred embodiment for repositioning the shear plates 22, 24 throughout the field of view, it should be understood that so far the shear plates 22, 24 have been laterally displaced along a horizontal line of displacement (that is a line of displacement that is perpendicular to the optical axis and generally horizontal) and that lateral displacement along this particular line of displacement creates a generally circular area of focus 28 that is symmetrical about the optical axis within the field of view. It has been discovered that an area of focus 28 having a somewhat rectangular shape and being vertically centered (from top to bottom) within the field of view 26 is formed when shear plates 22, 24 are laterally displaced (in opposing directions) along a line of displacement that is located 45° from horizontal. This is illustrated in FIG. 8, wherein shear plate 22 and 24 both maintain their orientation with respect to each other, and both move in opposing directions along a line of displacement that is 45° from the horizontal.

Figure 8:
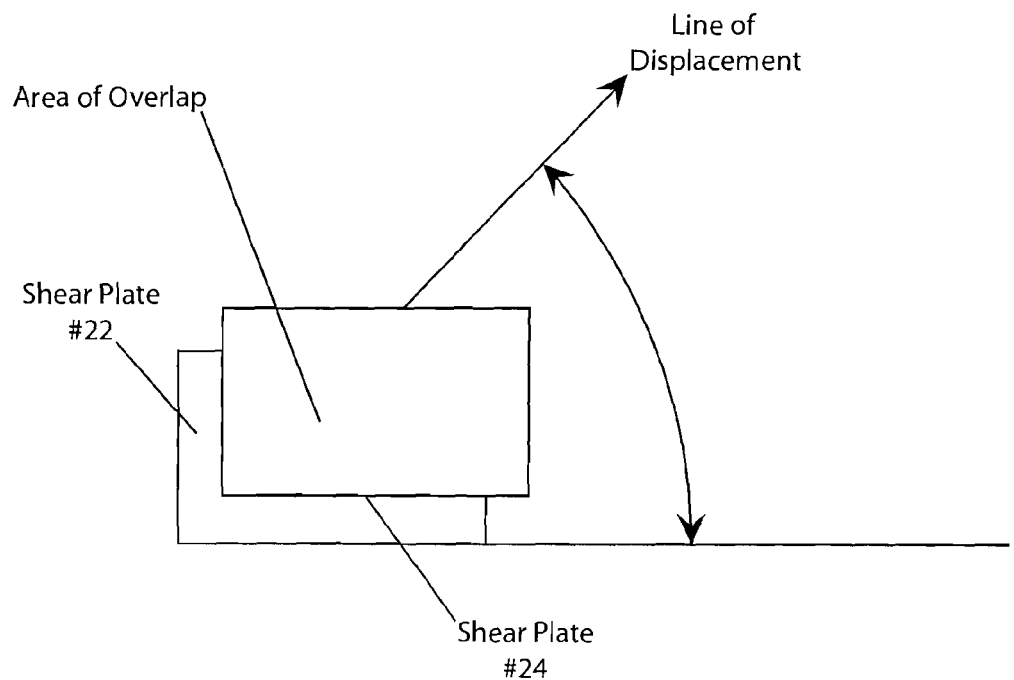
FIG. 8 is an illustrative view of shear plates, detailing a 45° line of displacement, according to the invention.
Figure 9:
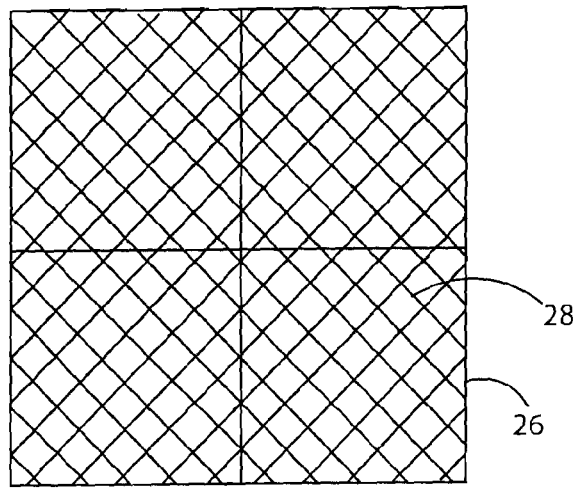
FIG. 9 is a representative view of a field of view of an optical system wherein hatching represents an area of focus, showing a full area of focus, according to the invention.
Figure 10:
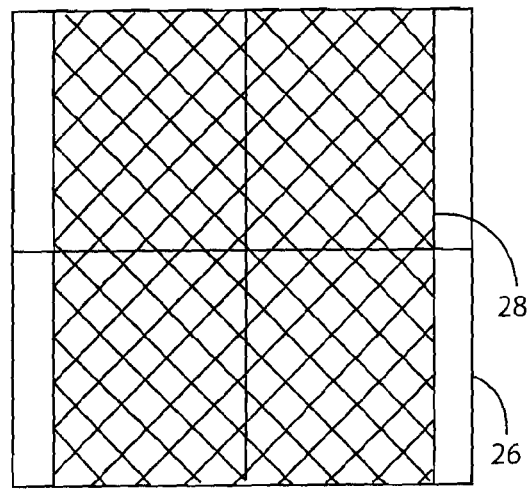
FIG. 10 is a representative view of a field of view of an optical system of FIG. 9, showing a vertically centered rectangular area of focus, according to the invention.
Figure 11:
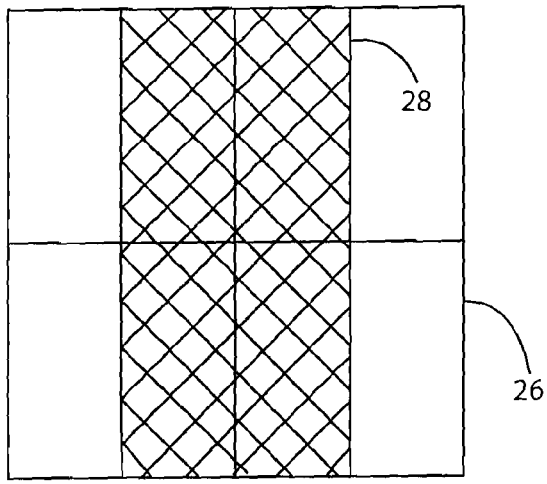
FIG. 11 is a representative view of a field of view of an optical system of FIG. 10, showing a narrower vertically centered rectangular area of focus, according to the invention.
Figure 12:
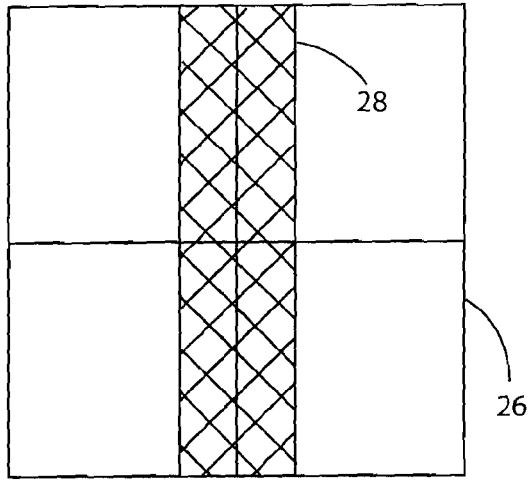
FIG. 12 is a representative view of a field of view of an optical system of FIG. 11, showing a narrower vertically centered rectangular area of focus, according to the invention.

Along the line of displacement shown in FIG. 8 (i.e., 45° from horizontal), as shear plate 22 is further displaced with respect to shear plate 24, the size of the area of focus 28 within the field of view 26 will narrow, but its generally rectangular shape will be maintained throughout the displacement. This is illustrated in FIGS. 10, 11, and 12 (from the "null or rest" position shown in FIG. 9, wherein both shear plates are in perfect registration and therefore there is no deformation of image light). Along the 45° line of displacement, the displacement of shear plates 22, 24 will create an ever narrowing rectangular area of focus 28 within the field of view 26 that remains centered about the vertical center line of the field of view, until a narrow vertical band is created, as shown in FIG. 12.

Figure 13:
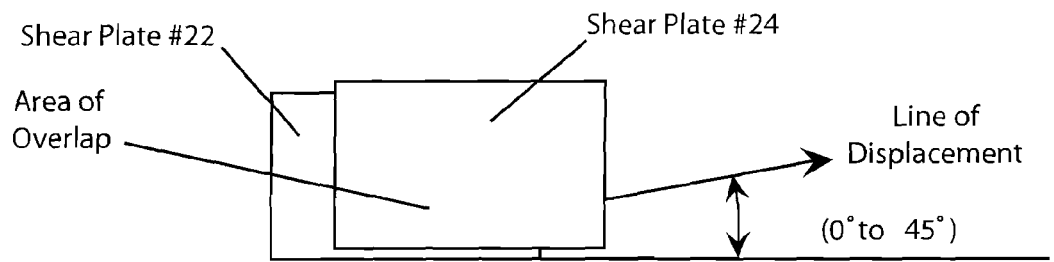
FIG. 13 is an illustrative view of shear plates, detailing a line of displacement that may vary between 0° and 45°, according to the invention.
Figure 14:
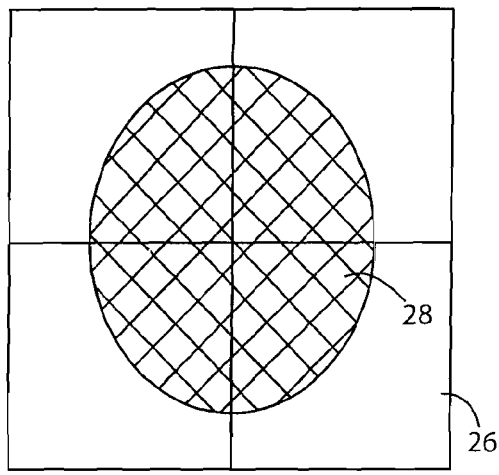
FIG. 14 is a representative view of a field of view of an optical system wherein hatching represents an area of focus, showing a wide ellipse shaped area of focus, according to the invention.
Figure 15:
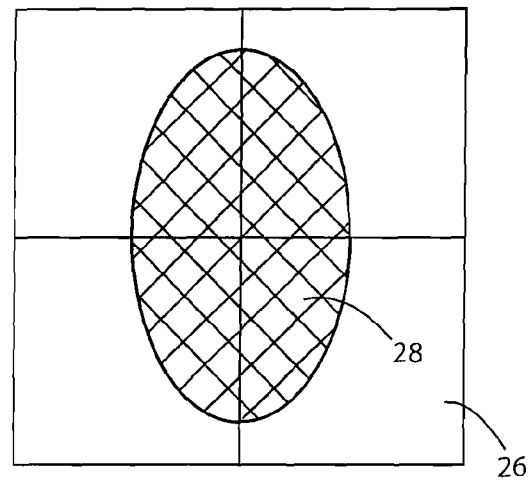
FIG. 15 is a representative view of a field of view of an optical system of FIG. 14, showing a narrower, taller ellipse shaped area of focus, according to the invention.
Figure 16:
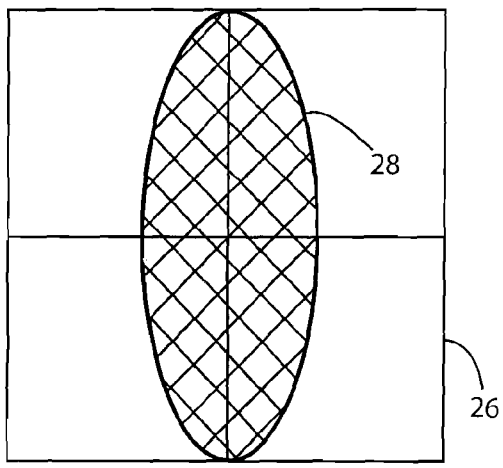
FIG. 16 is a representative view of a field of view of an optical system of FIG. 15, showing a narrower, taller ellipse shaped area of focus, according to the invention.
Figure 17:
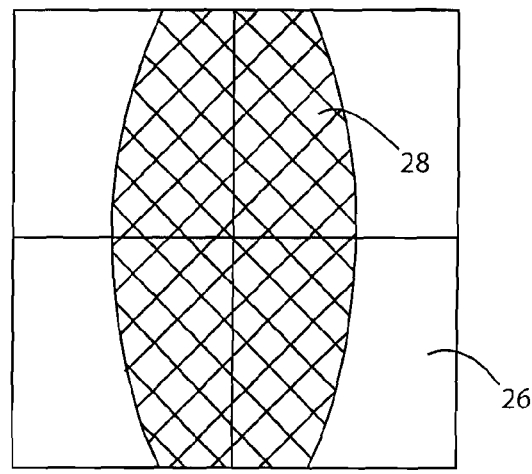
FIG. 17 is a representative view of a field of view of an optical system of FIG. 16, showing a narrower, taller ellipse shaped area of focus, according to the invention.

Referring to FIG. 13, it has further been determined that when shear plates 22, 24 are displaced along a line of displacement that is at an angle closer to horizontal (but greater than 0°), the shape of the area of focus 28 becomes elliptical, wherein the major diameter of the ellipse is vertically centered about the field of view 26. How the area of focus 28 changes with changing angle of line of displacement of shear plates 22, 24 (with the shear plates 22, 24, located in a non-registered position, for illustration) is illustrated in FIGS. 14, 15, 16, and 17. For each angle of displacement, the area of focus 28 transforms from an unaffected area of focus (wherein the area of focus 28 fills the entire field of view 26, as shown in FIG. 9) to a particular shape, such as a narrow ellipse, and will then alter the size of the area of focus 28 (while maintaining the particular shape) getting smaller as the plates are further displaced from each other along the particular angle of line of displacement.

As the angle of the line of displacement increases from 0° to 45°, the shape of the area of focus 28 transforms from being generally circular (at 0°) to a wide ellipse, then narrowing to a tall vertically aligned ellipse, and eventually becoming a rectangle at or near a line of displacement of 45° from horizontal.

As described above, by controlling the relative displacement of shear plates 22, 24 and controlling the angle of the line of displacement, a particular shape and size of area of focus 28 can be generated within the center of the field of view 26. Any portion of the image coinciding with that area of focus will be recorded "in focus" by the film within body 12 of the camera 10. All other portions of the image within the field of view 26 will appear soft, generally increasing in de-focus (magnitude of "out of focus") from the boundary of the area of focus 28.

As introduced above, it would be desirable to be able to control the particular area of focus 28 throughout the field of view 26 so that full regional focus control can be achieved. To accomplish this, referring to FIG. 18, shear plates 22, 24 are slidably mounted onto a shear-plate frame 40. Shear plates 22, 24 include a rack 42 along the length of at least one side 44 (preferably both sides) whose teeth face inward towards each other. At least one servo motor 46 (preferably two servo motors 46, one on each side 44) includes a pinion gear 48 which is positioned between each opposing rack 42 of each shear plate 22, 24 on at least one side (but preferably both sides). The arrangement is such that as servo motor 46 activates (as controlled by appropriate drive circuitry that is understood by those skilled in the art), pinion gear angularly displaces a predetermined magnitude and translates its rotation into linear displacement of the opposing engaged racks 42. The result is that servo motor controls the lateral displacement of shear plates 22, 24 by displacing both shear plates 22, 24 simultaneously within shear-plate frame 40.

Shear-plate frame 40 further includes a projected rack 50 which engages a pinion gear 52, which, in turn is secured to the output shaft of Servo motor 54 so that as servo motor activates and rotates pinion gear 52, engaged rack 50 linearly displaces the entire shear-plate frame 40. This linear displacement of shear-plate frame 40 is independent of the lateral displacement of shear plates 22, 24 and will not alter the relative position of shear plate 22 with respect to shear plate 24. The purpose of shear-plate frame 40 is to support shear plates 22, 24 and to allow controlled repositioning of the area of focus 28 within the field of view.

Figure 18:
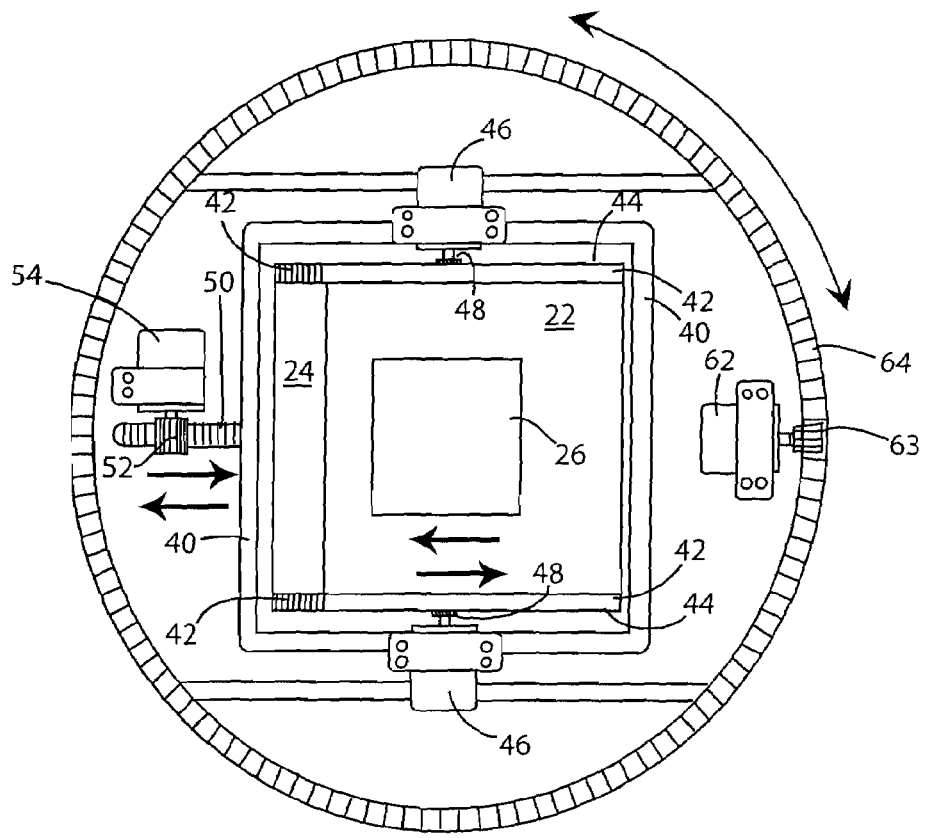
FIG. 18 is a plan view of a displacement carriage showing details of a shear-plate mount, servo motors, and an outer ring gear, according to the invention.
Figure 19:
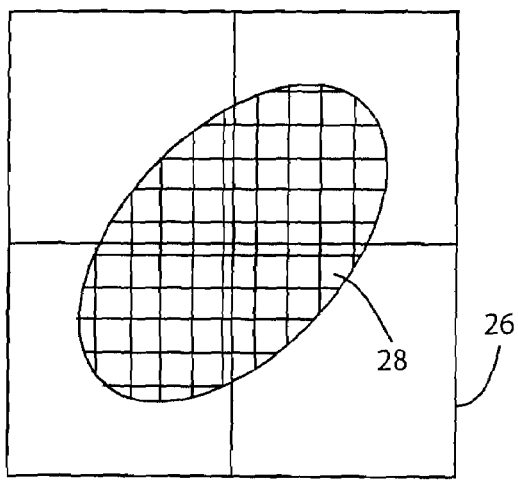
FIG. 19 is a representative view of a field of view of an optical system, showing an ellipse shaped area of focus, wherein the ellipse has been rotated within the field of view about the optical axis, according to the invention.
Figure 20:
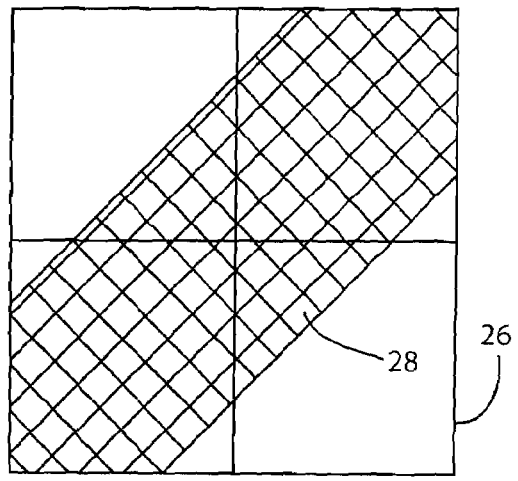
FIG. 20 is a representative view of a field of view of an optical system, showing a rectangular shaped area of focus, wherein the rectangle has been rotated within the field of view about the optical axis, according to the invention.
Figure 21:
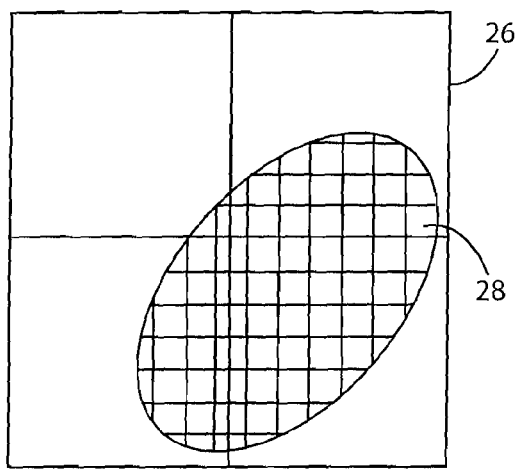
FIG. 21 is a representative view of a field of view of an optical system, showing an ellipse shaped area of focus, similar to that of FIG. 20, but wherein the ellipse has been repositioned to an off-center point within the field of view, according to the invention.
Figure 22:
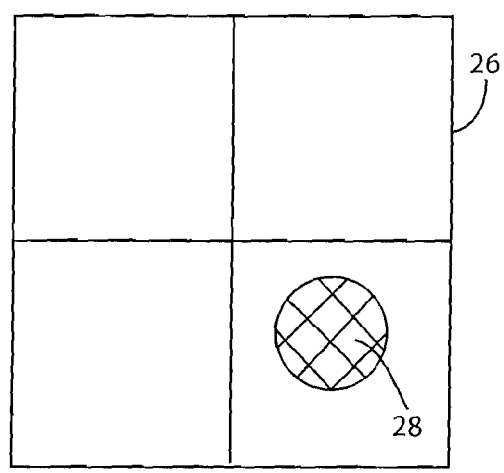
FIG. 22 is a representative view of a field of view of an optical system, showing a small circular area of focus, wherein the small circle has been re-positioned within the field of view to an off-center point within the field of view, according to the invention.

The mechanism thus far described will linearly reposition the area of focus 28 across the field of view 26, but only along a single axis of movement (horizontally, for example). To provide access to other areas within the field of view, a well known coordinate drive system can be employed (such as the servo controlling system used within plotters, for example), or a polar-coordinate system can be used, such as shown in FIG. 18. The entire shear-plate frame 40 is further mounted to a rotational plate 60, onto which another servo motor 62 is affixed. In this case, the servo motor 62 controls the rotation of a conical pinion gear 63 that is enaged with a peripheral ring gear 64 so that its rotation forces the rotational plate 60 and all its attached components, including the entire shear-plate frame 40 to rotate with respect to the stationary ring gear 64.

With the arrangement shown in FIG. 18, shear plates 22, 24 can first be laterally displaced to create a circular area of focus 28 at the center of the field of view 26. Servo motor 54 and servo motor 62 can be selectively activated, using well known controlling circuitry (not shown) to re-position the established area of focus 28 to any region within the field of view 26. Other mechanical systems can be deployed, as understood by those skilled in the art without departing from the gist of this invention, to establish an area of focus of particular and predetermined size and shape, and then to position that particular area of focus to any region within the field of view. FIGS. 19, 20, 21, and 22 illustrates various shaped and sized areas of focus 28 that are positioned at various locations within a field of view 26 and further angularly displaced. This shows how the areas of focus can be transformed and oriented according to the particular needs of the director and/or cameraman to create the desired focus or de-focus effect.

Furthermore, additional mechanical operators and linkages can be introduced to allow the line of displacement of shear plates 22, 24 to be varied between 0° and 45° from horizontal so that other shapes besides circular can be formed, including elliptical and rectangular, as described above.

Additionally, two or more shear plate systems can be introduced (or a single pair of shear plates created) wherein two or more areas of focus 28 are created, controlled, and positioned within a single field of view so that two separate areas within an image can be placed in regional focus, while de-focusing the remaining field of view.

Also, the mechanism shown in FIG. 18, and described above may include a mechanical and/or electro-mechanical linkage that automatically displaces other components of the optical system for various compensating and/or secondary optical effects, such as introducing fades, system-wide focus changes, or zoom changes.

The regional focus controlling system, described above may be used in any of a variety of optical systems, including cameras of all types, such as still, 35 mm, medium format, large format, and motion picture cameras. Also, medical systems that rely on optical imaging may benefit from the present system.

In the application of the present system to motion picture cameras, a touch-pad type cursor control can be used to allow a director to control (through indirect activation of the servo motors, described above) the size, shape and position of the area of focus 28 within the field of view 26, as viewed on a preview video monitor. The director (or cameraman) could then create an area of focus within the field of view merely by touching that corresponding area on the touch pad controller, and then move the area of focus by merely moving his finger across the pad. This would allow the cameraman to easily track the subject as he/she/it moves across the field of view 26 during shooting a scene. Also, two fingers contacting the touch-pad would generate two areas of focus, and so on.

Also, transducers of specific frequencies may be introduced to each actor within a scene, for example. Known identification techniques can be used to track each actor and thereby maintain a created area of focus 28 on a particular subject (actor of a selected frequency) automatically, as that particular subject moves throughout the scene.

Also, appropriate computer controlling circuitry (well known, and not described in detail or shown) can be employed to control the above described regional focusing system to create finite areas of focus within a field of view, or alternatively finite regions of de-focus within the field of view.

Finally, further regional focus control is contemplated through the use of three shear plates, lying adjacent to each other, wherein the two outer plates move together in one direction while the middle plate moves in the opposing direction. Similarly, four or more shear plates could be used wherein various combinations of plates can be displaced in opposing directions to create other image-degrading effects.

The invention claimed is:

1. A camera, comprising:
   a body having a front and a rear;
   a film plane located adjacent the rear of the body;
   an intermediate focal plane located a predetermined distance in front of the film plane, the intermediate focal plane having a first depth of field;
   a first lens located in front of the intermediate focal plane, the first lens having an optical axis and adapted to focus light from an image onto the image-receiving screen;
   a pair of lens elements arranged in tandem, one behind the other along their optical axis and located at the intermediate focal plane and adapted to receive light from the image; where the optical axis of the pair of lens elements is substantially normal to the lens surfaces and passes substantially through their centers;
   drive motor coupled to at least one of the pair of lens elements for selectively displacing at least one of the lens elements of the pair of lens elements to cause received light from the image to de-focus and create a de-focused image; and
   a second lens locate between said intermediate focal plane and said film plane, said second lens adapted to focus said selectively de-focused image onto said film plane.

2. The camera of claim 1 wherein the drive motor comprises a servo motor coupled to urge one of the pair of lens elements to be displaced relative to the other lens element.

3. The camera of claim 1 where the drive motor comprises a servo motor coupled to urge the pair of lens elements to be displaced laterally without altering the relative position of the two plates of the pair relative to each other.

4. The camera of claim 1 where the drive motor comprises a servo motor coupled to urge the pair of lens elements to be rotated without altering the relative position of the two plates of the pair relative to each other.

5. The camera of claim 1 wherein the drive motor comprises a first servo motor coupled to one of the pair of lens elements and a second servo motor coupled to the other lens element of the pair; wherein the first and second servo motor are adapted to linearly displace both lens elements simultaneously.

6. The camera of claim 5 further comprising;
   a third servo motor coupled to urge the pair of lens elements to rotate as a unit.

7. The camera of claim 1 wherein the drive motor comprises a servo motor coupled to urge one of the lens elements to rotate relative to the other lens element.

* * * * *